US012777569B2

(12) United States Patent
Taguchi et al.

(10) Patent No.: US 12,777,569 B2
(45) Date of Patent: Oct. 27, 2026

(54) VACUUM TUBE SUPPORT STRUCTURE

(71) Applicant: Yokogawa Electric Corporation, Musashino (JP)

(72) Inventors: Tomoya Taguchi, Musashino (JP); Kazuki Setsuda, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 113 days.

(21) Appl. No.: 18/655,734

(22) Filed: May 6, 2024

(65) Prior Publication Data

US 2024/0397602 A1 Nov. 28, 2024

(30) Foreign Application Priority Data

May 23, 2023 (JP) ................................ 2023-084819

(51) Int. Cl.
*H05G 1/04* (2006.01)
*H05G 1/02* (2006.01)

(52) U.S. Cl.
CPC ............... *H05G 1/04* (2013.01); *H05G 1/025* (2013.01)

(58) Field of Classification Search
CPC . H05G 1/025; H05G 1/04; H05G 1/06; G01B 15/025; G01B 15/02; F25D 31/00; H01J 19/54; H01J 19/64; H01J 19/74; H01J 21/00; H01J 35/04; H01J 35/16; H01J 2235/168; H01J 2235/165; H01J 35/112; H01J 35/065; H01J 9/39; H01J 35/1017; H01J 35/105; H01J 35/26; H01J 2235/1262; H01J 2235/122; H01J 2235/18; H01J 2235/10; H01J 35/10; H01J 35/18; H01J 35/106; H01J 2235/1245; H01J 2235/166; H01J 2235/1212; H01J 2235/1266;
(Continued)

(56) References Cited

U.S. PATENT DOCUMENTS 1,992,335 A 2/1935 Tietig
6,438,208 B1 * 8/2002 Koller .................... H05G 1/025
378/140
(Continued)

FOREIGN PATENT DOCUMENTS

CN 203894137 U 10/2014
CN 107941751 A 4/2018
(Continued)

OTHER PUBLICATIONS

Extended European Search Report dated Sep. 24, 2024, issued in counterpart Application No. 24170820.5. (65 pages).
(Continued)

*Primary Examiner* — Irakli Kiknadze
(74) *Attorney, Agent, or Firm* — WHDA, LLP

(57) ABSTRACT

A vacuum tube support structure includes a vacuum tube, a cover configured to cover the vacuum tube, and a support member configured to support the vacuum tube and the cover. The cover includes a fluid introduction port configured to allow a fluid to pass through the cover to introduce the fluid inside the cover and a fluid discharge port configured to allow the fluid to pass through the cover to discharge the fluid from inside the cover. The fluid introduced through the fluid introduction port contacts the vacuum tube and is discharged through the fluid discharge port.

13 Claims, 4 Drawing Sheets

(58) Field of Classification Search

CPC ....... H01J 2235/1216; H01J 2235/1283; H01J 2235/1291; H01J 35/186; G03B 21/16; G03B 21/2026; A61B 6/4014; A61B 6/4007; A61B 6/032; A61B 6/027; A61B 6/4488; A61B 5/150022; A61B 5/150213; A61B 5/150358; A61B 5/150412; A61B 5/150503; A61B 5/150587; A61B 5/15061; A61B 5/15113; A61B 5/15117; A61B 5/1519; A61B 5/157; A61B 2562/0295; A61B 6/06; A61B 6/4021; A61B 6/40; A61B 6/44; A61B 6/035; G01N 23/046; G01N 2223/419; G01R 31/304; G21K 5/04

USPC .......................................... 378/119, 121, 141

See application file for complete search history.

(56) References Cited

U.S. PATENT DOCUMENTS

| | | | | |
|---|---|---|---|---|
| 7,403,596 | B1 * | 7/2008 | Chaves | H05G 1/04 378/140 |
| 7,627,081 | B2 | 12/2009 | Bontus | |
| 2009/0225951 | A1 * | 9/2009 | Wandke | H01J 35/16 378/141 |
| 2013/0114794 | A1 | 5/2013 | Yamamoto | |
| 2015/0270092 | A1 * | 9/2015 | Gruchatka | A61B 6/4488 378/4 |
| 2016/0029468 | A1 | 1/2016 | Anno et al. | |
| 2021/0212188 | A1 | 7/2021 | Kawase | |
| 2023/0324281 | A1 | 10/2023 | Liu et al. | |

FOREIGN PATENT DOCUMENTS

| | | | |
|---|---|---|---|
| CN | 108507959 | A | 9/2018 |
| CN | 111537453 | A | 8/2020 |
| EP | 0290165 | A1 | 11/1988 |
| JP | 2002-124396 | A | 4/2002 |
| JP | 2008026229 | A | 2/2008 |
| JP | 2012-028093 | A | 2/2012 |
| JP | 2013-229328 | A | 11/2013 |
| JP | 2019-113465 | A | 7/2019 |
| JP | 2020-013715 | A | 1/2020 |
| JP | 6704100 | B1 | 6/2020 |

OTHER PUBLICATIONS

Extended European Search Report dated Oct. 8, 2024, issued in counterpart Application No. 2417281.4. (13 pages).

Extended European Search Report dated May 7, 2025, issued in counterpart Application No. 24172481.4. (12 pages).

Office Action dated Mar. 17, 2026, issued in counterpart JP Application No. 2023-084819, with English translation. (9 pages).

Office Action dated Aug. 4, 2026, issued in counterpart JP Application No. 2023-084819, with English translation. (8 pages).

* cited by examiner

VACUUM TUBE SUPPORT STRUCTURE

CROSS-REFERENCE TO RELATED APPLICATION

The present application claims priority to and the benefit of Japanese Patent Application No. 2023-084819 filed May 23, 2023, the entire contents of which are incorporated herein by reference.

TECHNICAL FIELD

The present disclosure relates to a vacuum tube support structure.

BACKGROUND

Vacuum tube support structures for storing and supporting vacuum tubes are known. See, for example, Patent Literature (PTL) 1.

CITATION LIST

Patent Literature

PTL 1: JP6704100B2

SUMMARY

A vacuum tube support structure including:
a vacuum tube;
a cover configured to cover the vacuum tube; and
a support member configured to support the vacuum tube and the cover, wherein
the cover includes a fluid introduction port configured to allow a fluid to pass through the cover to introduce the fluid inside the cover and a fluid discharge port configured to allow the fluid to pass through the cover to discharge the fluid from inside the cover, and
the fluid introduced through the fluid introduction port contacts the vacuum tube and is discharged through the fluid discharge port.

DETAILED DESCRIPTION

Figure 1:
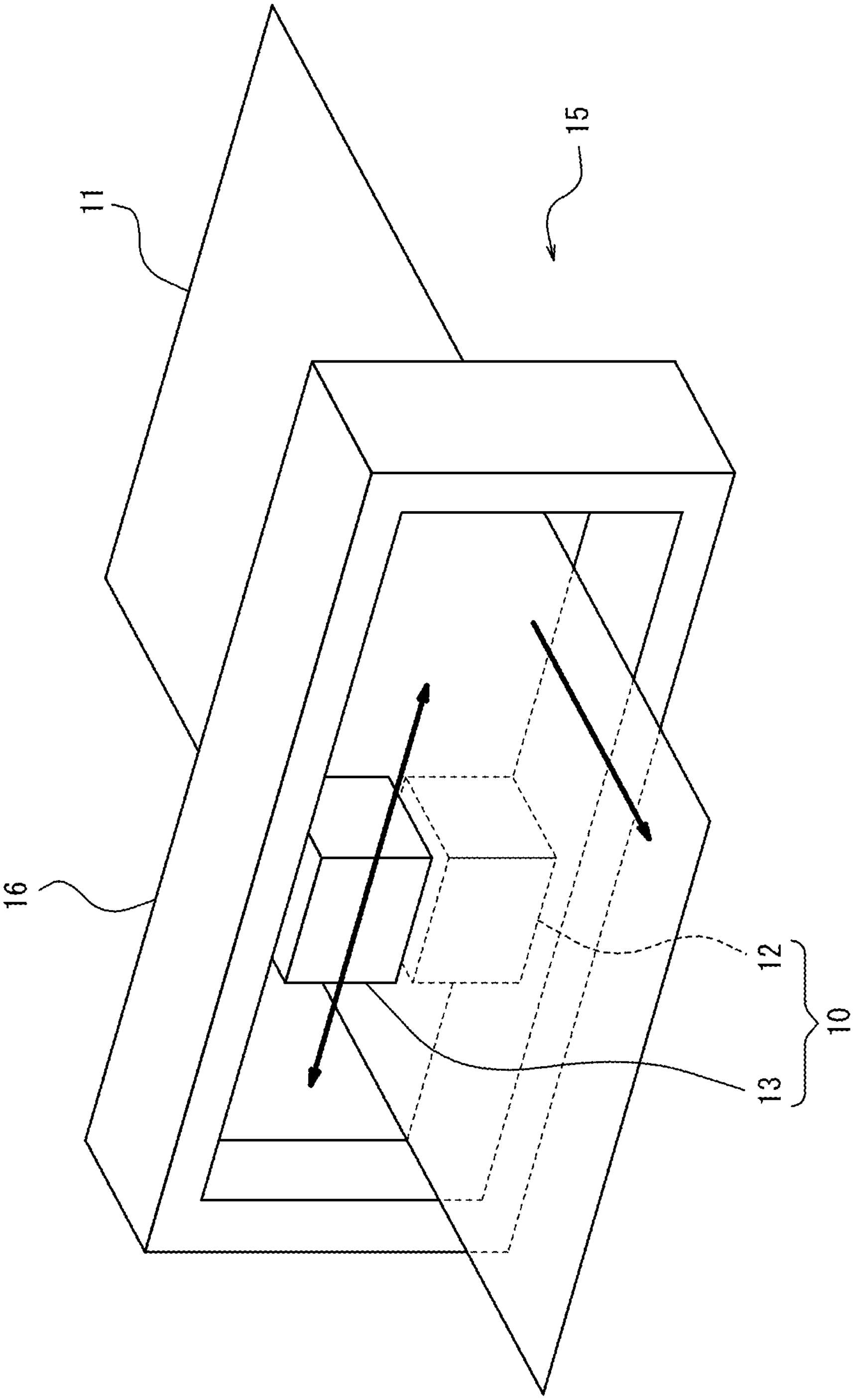
FIG. 1 is an external perspective view of a measurement apparatus according to an embodiment of the present disclosure.

In the aforementioned vacuum tube support structure, the temperature inside the vacuum tube support structure rises due to the heat generated by the vacuum tube, resulting in premature deterioration of the vacuum tube.

It would be helpful to provide a vacuum tube support structure such that the internal temperature does not rise easily.

An aspect of the present disclosure is as follows.

[1] A vacuum tube support structure including:
a vacuum tube;
a cover configured to cover the vacuum tube; and
a support member configured to support the vacuum tube and the cover, wherein
the cover includes a fluid introduction port configured to allow a fluid to pass through the cover to introduce the fluid inside the cover and a fluid discharge port configured to allow the fluid to pass through the cover to discharge the fluid from inside the cover, and
the fluid introduced through the fluid introduction port contacts the vacuum tube and is discharged through the fluid discharge port.

[2] The vacuum tube support structure according to [1], wherein the fluid discharge port is configured to allow wiring of the vacuum tube to pass through the fluid discharge port.

[3] The vacuum tube support structure according to [1] or [2], further including a fluid supply apparatus, wherein
the fluid supply apparatus is configured to supply the fluid to the fluid introduction port.

[4] The vacuum tube support structure according to [3], wherein
the fluid supply apparatus includes piping configured to connect to the fluid introduction port, and
the piping is configured to supply the fluid to the fluid introduction port.

[5] The vacuum tube support structure according to [3] or [4], wherein the fluid supply apparatus includes a fan configured to send the fluid.

[6] The vacuum tube support structure according to any one of [3] to [5], wherein the fluid supply apparatus includes a cooling apparatus capable of cooling the fluid.

[7] The vacuum tube support structure according to any one of [3] to [5], wherein
the fluid supply apparatus includes a temperature adjustment apparatus capable of adjusting a temperature of the fluid.

[8] The vacuum tube support structure according to any one of [1] to [7], further including a fluid discharge apparatus, wherein
the fluid discharge apparatus is configured to discharge the fluid from the fluid discharge port.

[9] The vacuum tube support structure according to [8], wherein
the fluid discharge apparatus includes piping configured to connect to the fluid discharge port, and
the piping is configured to discharge the fluid from the fluid discharge port.

[10] The vacuum tube support structure according to [8] or [9], wherein the fluid discharge apparatus includes a fan configured to send the fluid.

[11] A sensor including:
the vacuum tube support structure according to any one of [1] to [10], wherein
the sensor is configured to measure a physical quantity of a measurement target by receiving electromagnetic waves irradiated from the vacuum tube toward the measurement target.

[12] A measurement apparatus comprising:
the sensor according to [11]; and
a movement apparatus configured to move the sensor in a direction intersecting a direction of movement of the measurement target.

According to the present disclosure, a vacuum tube support structure such that the internal temperature does not rise easily can be provided.

Embodiments of the present disclosure are illustrated below with reference to the drawings.

Figure 2:
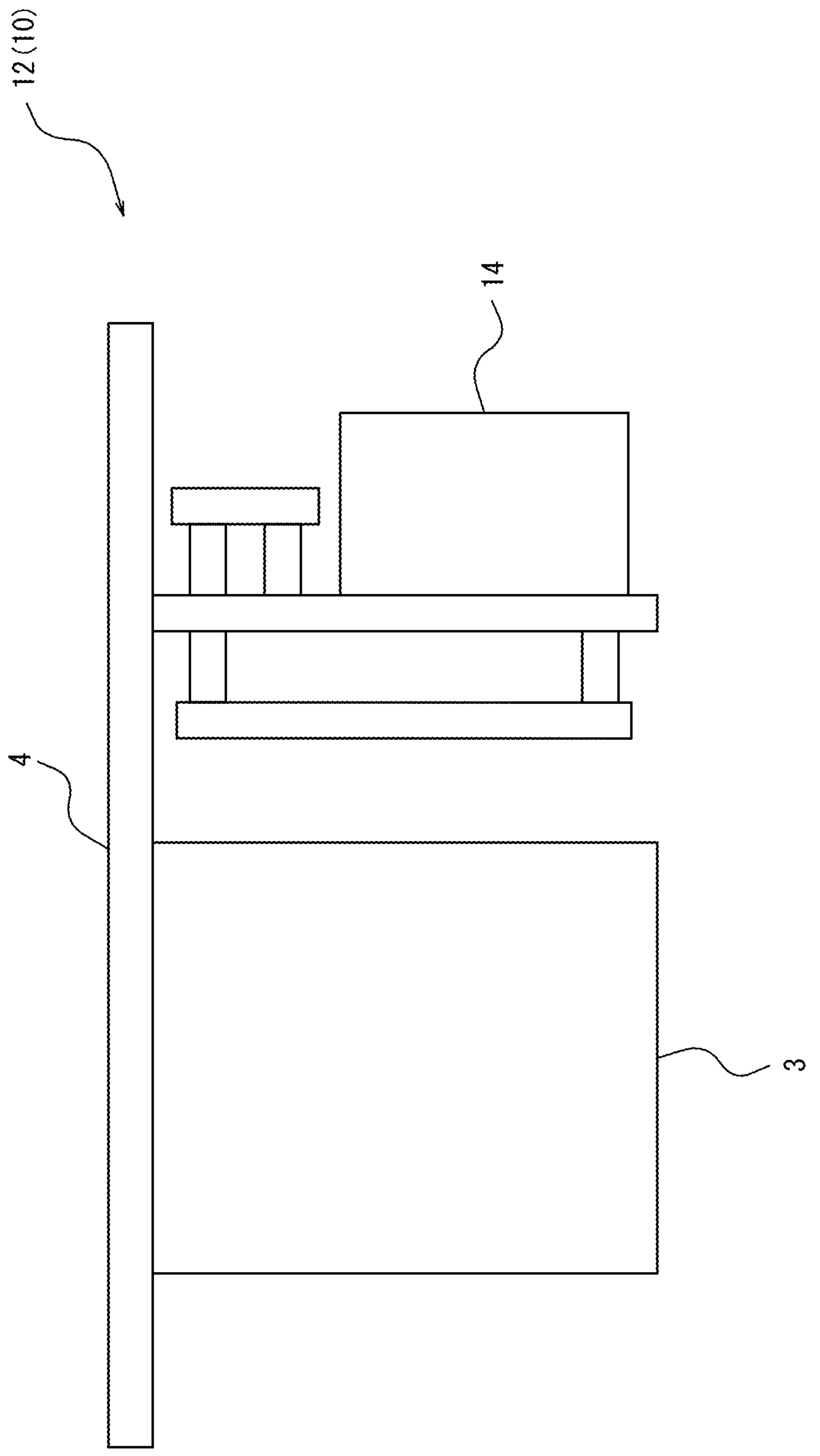
FIG. 2 is an external perspective view of a sensor in the measurement apparatus illustrated in FIG. 1.
Figure 3:
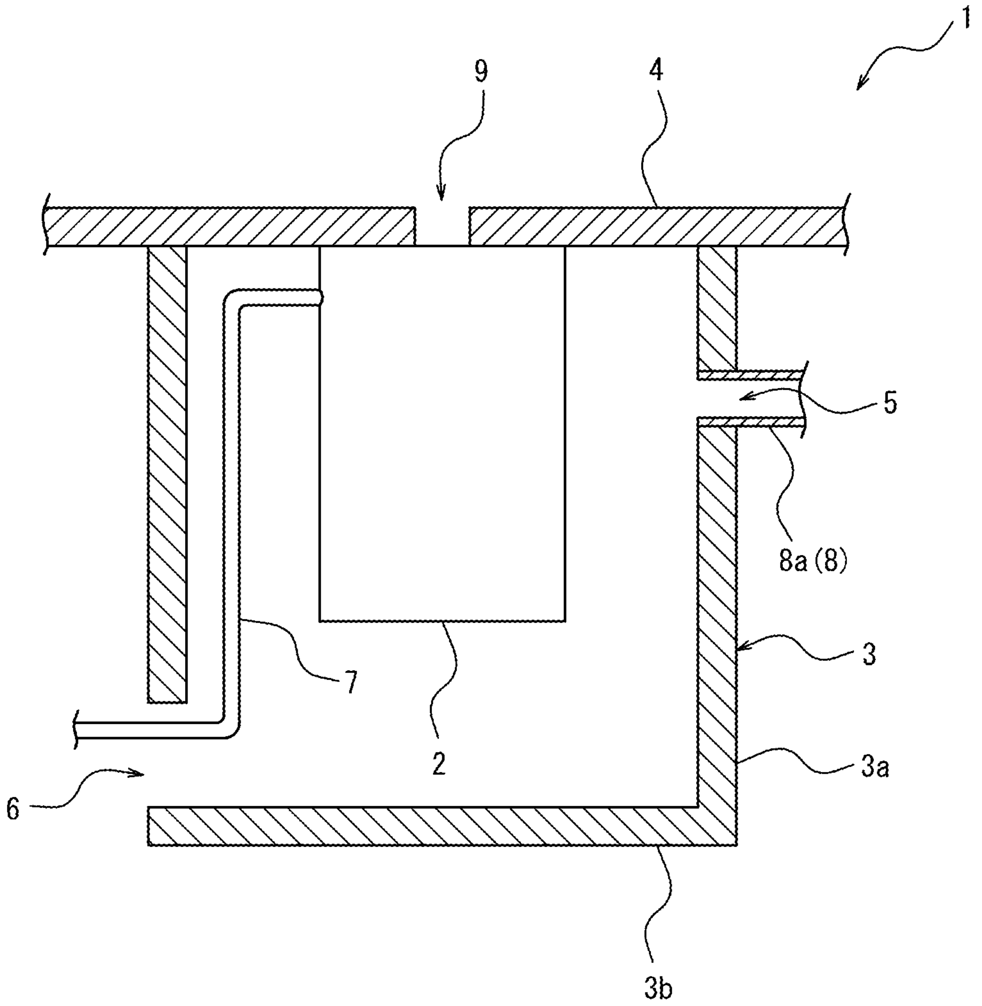
FIG. 3 is a cross-sectional diagram illustrating a vacuum tube support structure of the sensor illustrated in FIG. 2.

As illustrated in FIGS. 1 to 3, in an embodiment of the present disclosure, a vacuum tube support structure 1 includes a vacuum tube 2, a cover 3 that covers the vacuum tube 2, and a support member 4 that supports the vacuum tube 2 and the cover 3. The cover 3 includes a fluid introduction port 5 that allows a fluid to pass through the cover 3 to introduce the fluid inside the cover 3 and a fluid discharge port 6 configured to allow the fluid to pass through the cover 3 to discharge the fluid from inside the cover 3. The fluid introduced through the fluid introduction port 5 contacts the vacuum tube 2 and is discharged through the fluid discharge port 6.

According to the above configuration, the cover 3 covering the vacuum tube 2 can protect the surrounding area from high voltage applied to the vacuum tube 2. Furthermore, the fluid introduced inside the cover 3 from the fluid introduction port 5 comes in contact with the vacuum tube 2 and thus removes the heat generated by the vacuum tube 2. The fluid is then discharged from inside the cover 3 through the fluid discharge port 6, thereby suppressing a rise in temperature inside the cover 3. Therefore, a vacuum tube support structure 1 such that the internal temperature does not rise easily can be achieved. As a result, deterioration of the vacuum tube 2 can be suppressed, and the amount of work to replace the vacuum tube 2, for example, can be reduced.

The fluid discharge port 6 allows wiring 7 of the vacuum tube 2 to pass through the fluid discharge port 6. According to this configuration, the fluid discharge port 6 can also serve as a passage for the wiring 7 of the vacuum tube 2, thereby simplifying the vacuum tube support structure 1.

The vacuum tube support structure 1 includes a fluid supply apparatus 8, and the fluid supply apparatus 8 supplies the fluid to the fluid introduction port 5. According to this configuration, fluid can be easily introduced inside the cover 3 by the fluid supply apparatus 8.

The fluid supply apparatus 8 includes piping **8*a* connecting to the fluid introduction port 5, and the piping 8*a* supplies the fluid to the fluid introduction port 5. According to this configuration, the piping 8*a* can be used to introduce the fluid from a desired location to the fluid introduction port 5**.

Figure 4:
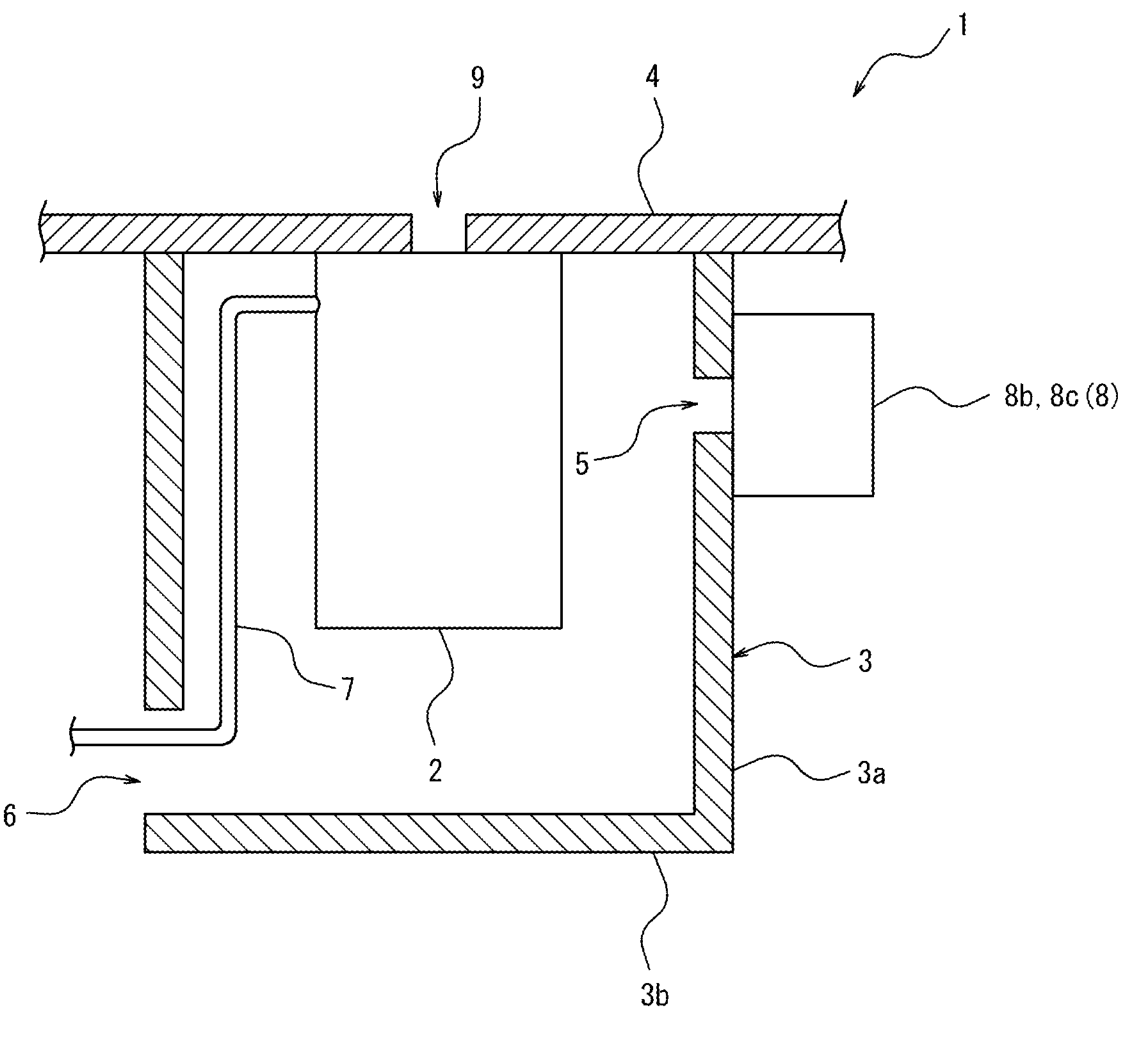
FIG. 4 is a cross-sectional diagram illustrating another example of the vacuum tube support structure illustrated in FIG. 3.

As in the example illustrated in FIG. 4, the fluid supply apparatus 8 may be configured to include a fan **8*b* that sends the fluid. According to this configuration, the structure of the fluid supply apparatus 8 can be simplified, since the fluid can be sent to the fluid introduction port 5 by the fan 8*b***.

As in the example illustrated in FIG. 4, the fluid supply apparatus 8 may be configured to include a cooling apparatus **8*c* capable of cooling the fluid. According to this configuration, since the cooling apparatus 8*c* can supply cooled fluid, a vacuum tube support structure 1** such that the internal temperature does not rise easily can be achieved.

While not illustrated, the fluid supply apparatus 8 may be configured to include a temperature adjustment apparatus capable of adjusting the temperature of the fluid. According to this configuration, since the temperature adjustment apparatus can supply an appropriately cooled fluid, the temperature inside the vacuum tube support structure 1 can be appropriately controlled.

While not illustrated, the vacuum tube support structure 1 may be configured to include a fluid discharge apparatus, and the fluid discharge apparatus may discharge the fluid from the fluid discharge port 6. According to this configuration, fluid can be easily discharged from inside the cover 3 by the fluid discharge apparatus.

While not illustrated, the fluid discharge apparatus may be configured to include piping **8*a* that connects to the fluid discharge port 6, and the piping 8*a* may discharge the fluid from the fluid discharge port 6. According to this configuration, the piping 8*a* can be used to discharge the fluid from the fluid discharge port 6** to a desired location.

While not illustrated, the fluid discharge apparatus may be configured to include a fan **8*b* that sends the fluid. According to this configuration, the structure of the fluid discharge apparatus can be simplified, since the fluid can be discharged from the fluid discharge port 6 by the fan 8*b***.

The cover 3 includes a peripheral wall member **3*a*, which has one end supported by the support member 4, and an end member 3*b* provided at the other end of the peripheral wall member 3*a*. According to this configuration, the cover 3** can be achieved with a simple structure.

The fluid introduction port 5 and the fluid discharge port 6 are located in the peripheral wall member **3*a*. According to this configuration, the heat generated by the vacuum tube 2 can be efficiently removed, and a rise in temperature inside the cover 3** can be further suppressed.

The vacuum tube 2 is an x-ray tube that emits x-rays. X-ray tubes are particularly prone to deterioration due to heat generation. Therefore, deterioration can be significantly suppressed by using the vacuum tube support structure 1 according to this configuration, in which the internal temperature does not rise easily. The vacuum tube 2 is not limited to being an x-ray tube but may also be configured to emit electromagnetic waves other than x-rays.

The vacuum tube support structure 1 includes an electromagnetic wave transmission space 9 that allows electromagnetic waves emitted by the vacuum tube 2 to be transmitted through the vacuum tube support structure 1 for emission from within the vacuum tube support structure 1. According to this configuration, electromagnetic waves can be emitted through the electromagnetic wave transmission space 9. As illustrated in FIGS. 3 and 4, the support member 4 includes the electromagnetic wave transmission space 9, but this configuration is not limiting.

A sensor 10 includes the vacuum tube support structure 1 and measures a physical quantity of a measurement target 11 by receiving electromagnetic waves irradiated from the vacuum tube 2 toward the measurement target 11. In greater detail, the sensor 10 includes a transmitter 12 that includes the vacuum tube support structure 1 and irradiates electromagnetic waves from the vacuum tube 2 toward the measurement target 11 and a receiver 13 that receives the electromagnetic waves irradiated toward the measurement target 11. According to this configuration, it is possible to achieve a sensor 10 that includes a vacuum tube support structure 1 such that the internal temperature does not rise easily.

As illustrated in FIG. 1, the sensor 10 is a transmission-type sensor such that the transmitter 12 and the receiver 13 are installed on different sides as viewed from the measurement target 11, but this configuration is not limiting. The sensor 10 may also be configured as a reflection-type sensor such that the transmitter 12 and the receiver 13 are installed on the same side as viewed from the measurement target 11.

The sensor 10 includes a power source 14 that supplies power to the vacuum tube 2, and the power source 14 is supported by the support member 4. According to this configuration, the structure of the sensor 10 can be simplified.

A measurement apparatus 15 includes the sensor 10 and a movement apparatus 16 that moves the sensor 10 in a direction intersecting (see the double bold arrows in FIG. 1)

the direction of movement (see the bold arrow in FIG. 1) of the measurement target 11. According to this configuration, it is possible to achieve a measurement apparatus 15 that includes a vacuum tube support structure 1 such that the internal temperature does not rise easily.

The measurement apparatus 15 is installed on a production line along which the measurement target 11 flows. According to the this configuration, a physical quantity of the measurement target 11 can be measured on the production line.

The measurement apparatus 15 is configured as a thickness gauge, such as a basis weight meter, that measures the thickness of the measurement target 11 by the intensity of the electromagnetic waves received by the receiver 13. According to this configuration, it is possible to achieve a thickness gauge that includes a vacuum tube support structure 1 such that the internal temperature does not rise easily.

The present disclosure is not limited to the above-described embodiments and can be modified in various ways without departing from the scope thereof.

The invention claimed is:

1. A measurement apparatus comprising a sensor, the sensor comprising a vacuum tube support structure, the vacuum tube support structure comprising:

a vacuum tube;

a cover configured to cover the vacuum tube; and a support wall configured to support the vacuum tube and the cover, wherein the cover includes a fluid introduction port configured to allow a fluid to pass through the cover to introduce the fluid inside the cover and a fluid discharge port configured to allow the fluid to pass through the cover to discharge the fluid from inside the cover, the support wall includes an electromagnetic wave transmission space configured to allow electromagnetic waves emitted by the vacuum tube to be transmitted from inside of the vacuum tube support structure, the fluid introduced through the fluid introduction port contacts the vacuum tube and is discharged through the fluid discharge port, and the sensor is configured to measure a physical quantity of a measurement target by receiving the electromagnetic waves irradiated from the vacuum tube toward the measurement target.

2. The measurement apparatus according to claim 1, wherein the fluid discharge port is configured to allow wiring of the vacuum tube to pass through the fluid discharge port.

3. The measurement apparatus according to claim 1, further comprising a fluid supply apparatus, wherein the fluid supply apparatus is configured to supply the fluid to the fluid introduction port.

4. The measurement apparatus according to claim 3, wherein the fluid supply apparatus includes piping configured to connect to the fluid introduction port, and the piping is configured to supply the fluid to the fluid introduction port.

5. The measurement apparatus according to claim 3, wherein the fluid supply apparatus includes a fan configured to send the fluid.

6. The measurement apparatus according to claim 3, wherein the fluid supply apparatus includes a cooling apparatus capable of cooling the fluid.

7. The measurement apparatus according to claim 3, wherein the fluid supply apparatus includes a temperature adjustment apparatus capable of adjusting a temperature of the fluid.

8. The measurement apparatus according to claim 1, further comprising a fluid discharge apparatus, wherein the fluid discharge apparatus is configured to discharge the fluid from the fluid discharge port.

9. The measurement apparatus according to claim 8, wherein the fluid discharge apparatus includes piping configured to connect to the fluid discharge port, and the piping is configured to discharge the fluid from the fluid discharge port.

10. The measurement apparatus according to claim 8, wherein the fluid discharge apparatus includes a fan configured to send the fluid.

11. The measurement apparatus according to claim 1, comprising:

a movement apparatus configured to move the sensor in a direction intersecting a direction of movement of the measurement target.

12. The measurement apparatus according to claim 1, wherein the cover includes a peripheral wall, which has one end supported by the support wall, and an end wall provided at the other end of the peripheral wall.

13. The measurement apparatus according to claim 12, wherein the fluid introduction port and the fluid discharge port are located in the peripheral wall.

* * * * *